Dec. 1, 1936.  F. A. SMALLEY  2,062,532
PORTABLE PUMP
Filed Aug. 19, 1935   2 Sheets-Sheet 1
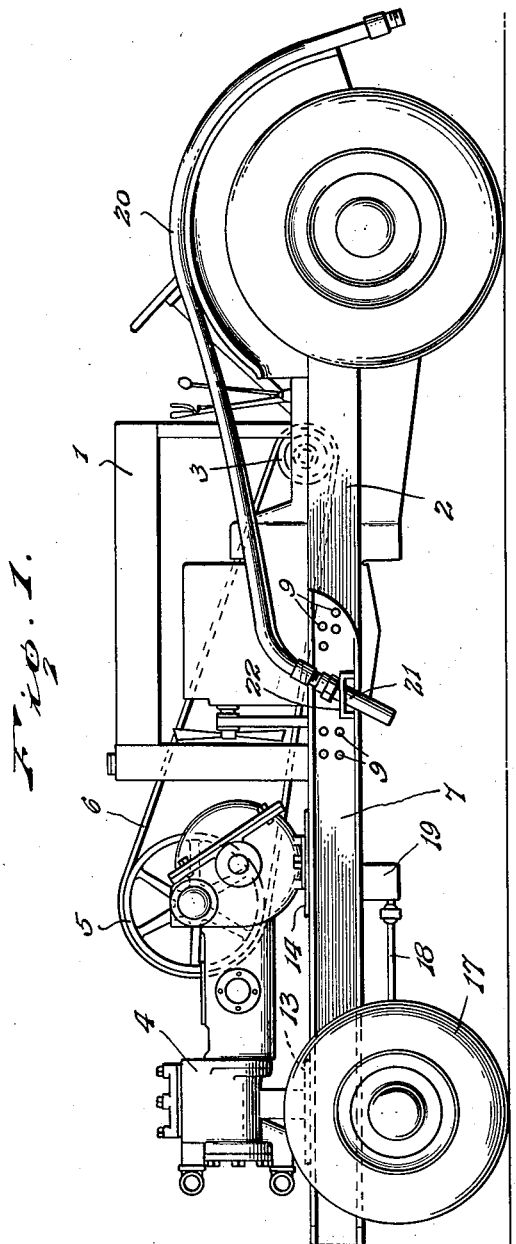
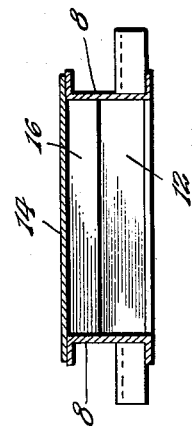
Inventor
F. A. Smalley.
By Lacey & Lacey,
Attorneys

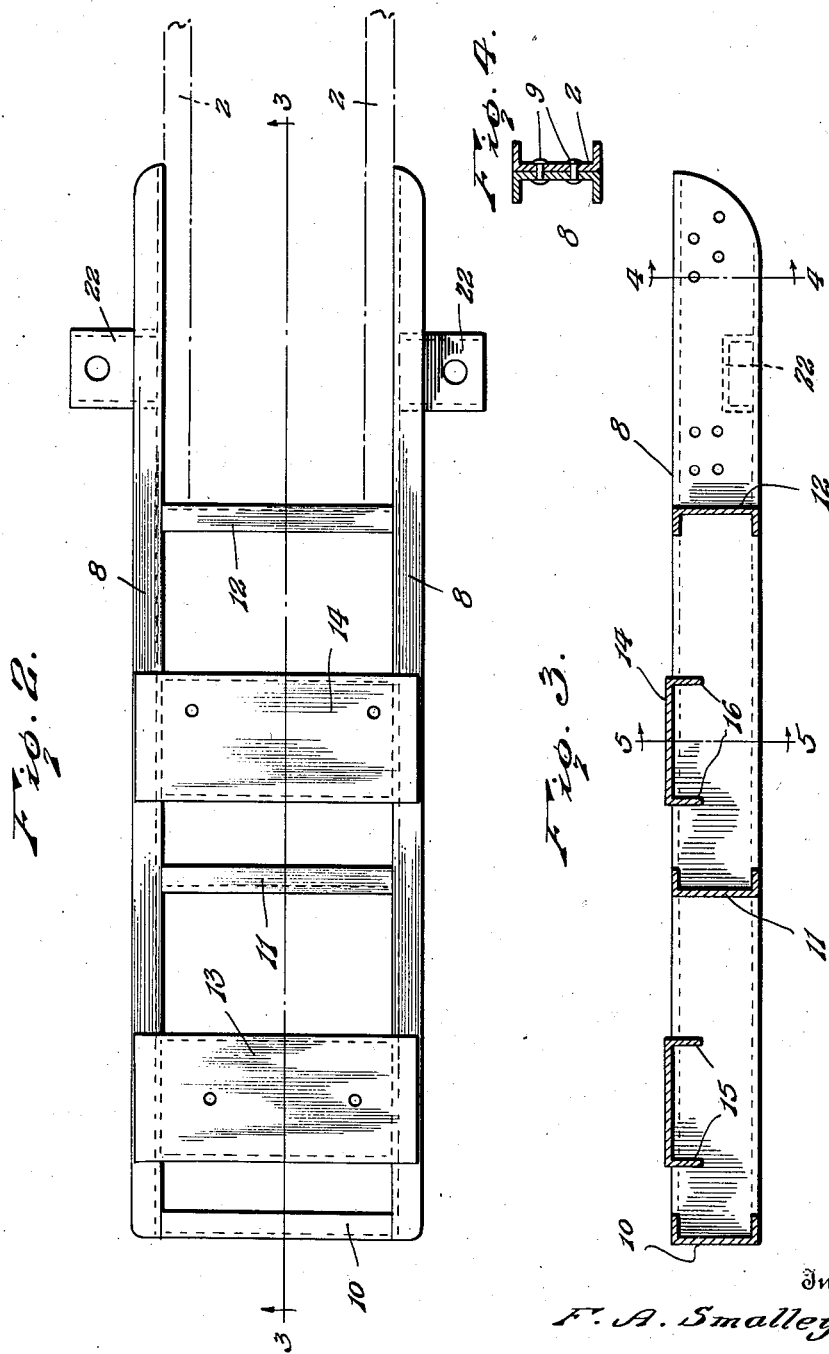

Patented Dec. 1, 1936

2,062,532

UNITED STATES PATENT OFFICE 2,062,532

PORTABLE PUMP

Francis A. Smalley, Blackwell, Okla.

Application August 19, 1935, Serial No. 36,897

4 Claims. (Cl. 180—53)

This invention relates to a portable pump, and one object of the invention is to provide a pump having a base or supporting frame which may be secured to and form an extension at the front of the chassis of a tractor with the front wheels and their axle transferred from the front of the tractor frame to the forward portion of the pump frame and thus provide a portable pump which will be stable and well balanced and so mounted that it may be driven from the engine of the tractor.

Another object of the invention is to so form the supporting frame of the pump that it may be very easily applied to the chassis frame of a tractor of a conventional construction and thus sold as an accessory to be applied to a tractor.

Another object of the invention is to so form the pump frame that it will be very strong and not liable to be distorted by strains created when the pump is in operation or during movement of the combined tractor and pump from one place to another.

The invention is illustrated in the accompanying drawings, wherein

Figure 1 is a side elevation of the improved portable pump.

Figure 2 is a top plan view of the pump frame.

Figure 3 is a sectional view taken longitudinally through the pump frame on the line 3—3 of Figure 2.

Figure 4 is a fragmentary sectional view taken along the line 4—4 of Figure 3 and illustrating the manner in which the pump frame is secured to the tractor frame.

Figure 5 is a sectional view taken transversely through the pump frame along the line 5—5 of Figure 3.

The tractor, which is indicated in general by the numeral 1, is of a conventional construction and has a frame of the usual construction which includes side bars 2 formed of channel metal, as shown clearly in Figure 4. The usual pulley 3 is provided as a power take off and the steering gear and control means will be of the usual construction.

The pump 4 is of the reciprocating piston type and has a drive shaft upon which is mounted a large pulley 5 about which a belt 6 is to be engaged in order that power may be transmitted from the pulley 3 when the pump is in operation, as shown in Figure 1. This pump is carried by a frame 7 which is mounted in front of the tractor frame and has side bars 8 formed of channel metal and corresponding to the transverse dimensions of the chassis bars 2 of the tractor frame so that when the pump frame is applied to the chassis of the tractor, the side bars 8 may be disposed longitudinally of the chassis bars 2 in overlapping relation thereto, as shown in Figure 2, with their flat inner faces bearing against the flat outer faces of the bars 2 and their upper and lower flanges projecting in an opposite direction to the flanges of the bars 2. Registering openings are formed in the bars 2 and 8 and through these openings are passed fasteners 9 which may be rivets, as shown, or bolts if it is desired to permit the pump frame to be easily and quickly detached from the tractor frame. Forward ends of the side bars 8 are connected by a cross bar 10 also of channel metal and as additional braces for the pump frame, there have been provided cross bars 11 and 12 which extend between the side bars 8 and are spaced from each other longitudinally of the pump frame. By referring to Figure 2 it will be seen that the rear cross bar 12 is disposed in such spaced relation to the rear ends of the side bars 8 that when the pump frame is applied to the tractor frame, the cross bar 12 will have abutting engagement with forward ends of the side bars 2 of the tractor frame.

Front and rear bolsters 13 and 14 extend transversely across the pump frame in spaced relation to each other longitudinally thereof with one located between the cross bars 10 and 11 and the other between the cross bars 11 and 12. These bolsters are formed of angle metal to provide depending side flanges 15 and 16 which extend between the side bars 8 with their ends abutting the inner faces of the side bars and referring to Figures 2 and 5 it will be seen that portions of the bolsters which project beyond ends of the depending side flanges rest upon upper faces of the side bars 8 where they may be welded or otherewise firmly secured to the side bars. A very strong and durable pump supporting frame has thus been provided with the bolsters 13 and 14 so located that when the pump is set in place and secured by bolts passed through the openings formed in the bolsters, the pump will be mounted in front of the tractor and extend longitudinally of the tractor and pump supporting frame.

When the pump frame is to be applied to the tractor the front wheels 17 and their supporting axle and radius rods 18 are detached from the tractor frame. The steering mechanism is also detached and after the pump frame has been secured to the side bars of the tractor frame, the front wheels and their axle are moved into position adjacent the forward end portion of the pump frame and the axle secured to the pump frame in the same manner in which it was previously secured to the tractor frame. The radius rods extend rearwardly and the cross bar 19 to which their rear ends are mounted secured to the pump frame under the bolster 14. A longer steering rod may be substituted in place of the one previously used in order that it may be operatively connected to the cross rod connecting the front wheels, or an extension rod may be set in place between the steering rod and the cross rod connecting the front wheels.

When this portable pump is in use, the operator drives the tractor in the usual manner and as the pump is mounted in front of the tractor frame between the engine and the forward end of the pump frame with a portion over the axle of the front wheels, the weight will be so distributed that likelihood of the device tilting out of its proper position will be eliminated. When the place at which the pump is to be used has been reached, the belt 6 will be applied to the pulleys 3 and 5 and lengths of hose connected with the inlet and outlet of the pump. The two lengths of hose, one of which has been shown in Figure 1 and indicated by the numeral 20, are disposed at opposite sides of the tractor when not in use and each has a fitting 21 at one end which is engaged through an opening formed in a bracket 22 projecting transversely from a side bar of the pump frame. The rear portion of the hose rests upon the mud guard over the rear wheel and if found necessary a clamp or other means may be employed for securely but detachably holding the hose in its proper position upon the mud guard. If it is desired to use the tractor without the pump, the fasteners 9, which will preferably be bolts when alternate use of the tractor and pump is desired, will be removed and, after separating the pump frame from the tractor frame, the front wheels and associated parts will be restored to their original positions under the tractor frame.

Having thus described the invention, what is claimed as new is:

1. The combination with a motor vehicle having a chassis frame including side bars, an auxiliary frame having side bars, the auxiliary frame being disposed in front of the vehicle with rear portions of its side bars disposed in overlapping relation to side bars of the vehicle frame and bearing against side faces thereof, fasteners passed through the overlapped portions of the side bars of the auxiliary frame and vehicle frame, said auxiliary frame having a cross bar extending between and secured to its side bars in position to bear against the forward end of the vehicle frame, front and rear bolsters extending between and carried by the side bars of the auxiliary frame, a pump secured upon said bolsters, and means for transmitting motion from the motor of the vehicle to said pump.

2. In a portable pump, a frame including side bars having rear portions adapted to be secured in overlapping relation to the side bars of the chassis frame of a tractor to mount the frame in front of the tractor, a cross bar extending between and secured to the side bars of said frame in position to bear against the front ends of the side bars of the chassis frame when the side bars of the said frame are secured against the side bars of the chassis frame, supporting wheels for said frame, and supporting means extending transversely of the frame and secured to the side bars thereof in position to have a pump secured thereon and support the pump upon the frame.

3. In a portable pump, a frame having side bars, a bridging bar connecting forward ends of said side bars, cross bars extending between and secured to the side bars in spaced relation to each other longitudinally thereof, the rear one of said cross bars being spaced from the rear ends of the side bars whereby the portions of the side bars rearwardly of the rear cross bar may be disposed in overlapping relation to side bars of a tractor frame and secured thereto with the rear cross bar in abutting relation to side bars of the tractor frame, and bolsters carried by the side bars of said frame and spaced from each other longitudinally of the frame for supporting a pump upon the frame.

4. In a portable pump, a frame having side bars formed of angle metal with their flanges projecting outwardly, a bridging bar extending between and connecting forward ends of the side bars, cross bars of angle metal extending between and firmly secured to the side bars and disposed in spaced relation to each other longitudinally of the frame whereby portions of the side bars rearwardly of the rear one of said cross bars may be disposed in overlapping relation to the side bars of a tractor frame and firmly secured thereto, and front and rear bolsters extending between the side bars of said frame in spaced relation to each other longitudinally thereof for supporting a pump, each bolster being formed of angle metal and having depending flanges terminating in spaced relation to its ends whereby the bolsters may be disposed transversely of the frame with their depending flanges abutting the inner side faces of the side bars and the ends of the bolsters resting upon and firmly secured to the upper faces of the side bars.

FRANCIS A. SMALLEY.